United States Patent [19]

Wotherspoon

[11] Patent Number: 4,784,862
[45] Date of Patent: Nov. 15, 1988

[54] CONTINUOUS PRODUCTION OF GELLED CHUNKS OF FOODSTUFFS

[75] Inventor: Colin Wotherspoon, Ousden, England

[73] Assignee: Spillers Limited, London, England

[21] Appl. No.: 42,559

[22] Filed: Apr. 24, 1987

Related U.S. Application Data

[63] Continuation of Ser. No. 821,653, Jan. 23, 1986, abandoned.

[30] Foreign Application Priority Data

Jan. 29, 1985 [GB] United Kingdom ................. 8502124

[51] Int. Cl.$^4$ ................................................ A23L 1/04
[52] U.S. Cl. .................................... 426/103; 426/575; 426/249; 426/805
[58] Field of Search ............... 426/575, 103, 249, 805, 426/573, 574

[56] References Cited

U.S. PATENT DOCUMENTS

| 4,126,704 | 11/1978 | McCarthy et al. | 426/575 |
| 4,347,261 | 8/1982 | Challen et al. | 426/575 |
| 4,348,418 | 9/1982 | Smith et al. | 426/575 |
| 4,362,748 | 12/1982 | Cox | 426/575 |

FOREIGN PATENT DOCUMENTS

| 0009897 | 4/1980 | European Pat. Off. | 426/575 |
| 0586157 | 3/1947 | United Kingdom | 426/575 |

Primary Examiner—Jeanette Hunter
Attorney, Agent, or Firm—Beveridge, DeGrandi & Weilacher

[57] ABSTRACT

A method of producing chunks of gelled food in a slurry by forming a first slurry having a gelling agent, forming a second slurry containing a gel activator, at least one of the slurries containing comminuted food; bringing the slurries together and gently mixing thereby breaking said food-containing slurry into random and irregularly shaped chunks while the gel activator simultaneously reacts at the interface with the gelling material thereby forming a gel skin which encapsulates the chunks.

43 Claims, No Drawings

CONTINUOUS PRODUCTION OF GELLED CHUNKS OF FOODSTUFFS

This application is a continuation of application Ser. No. 821,653, filed Jan. 23, 1986, now abandoned.

The present invention relates to the continuous production of foodstuffs from comminuted materials and more particularly to the continuous production of reconstituted products from comminuted materials.

A wide variety of materials having food or nutritional value are available for incorporation in foodstuffs, but in the blending of such materials to form a desired balance it is usually necessary and/or convenient to break up the ingredients into finely divided form. The end result is a textureless slurry or paste which needs to be further processed so as to reconstitute the ingredients and provide a texture and a degree of solidity to the final product to render it more attractive to the ultimate user.

It has been proposed to impart what has been termed chunkiness to such materials by incorporating a gelling agent into the product forming shaped chunks of the mixture and reacting these with a solution of a soluble salt which reacts with the gelling agent to form a gel and thereafter suspending such preformed chunks in a gel containing finely divided nutritional material. Because of the manner in which the chunks have been preformed, usually by a moulding operation, they have generally conformed to a definite shape which is a cube or a ball shape and they have not generally achieved a good simulation of the material prior to comminution. A major disadvantage of prior art methods however, is that they do not lend themselves easily to continuous production and also give rise to considerable problems in packaging, especially when canning of the product is to be carried out.

In the production for example, of pet foods, and in particular canned pet foods, various ways of imparting chunkiness to the products have been used. One such way that has been developed is to add preformed chunks of textured vegetable protein which are stable to heat processing to the minced meat offals and suspend these in a gel. In addition to the problems outlined above high levels of textured vegetable proteins are in general unacceptable to domestic pets and therefore this method has found only limited application in practice.

Another method proposed has been to re-form the ground or comminuted meat into shape-retaining cubes or balls by incorporating a soluble alginate salt into the ground meat and reacting this in a variety of ways with calcium ions. The calcium ions react with a soluble alginate salt, thereby rendering it insoluble and a gel is formed which is relatively stable to heat and binds the particles of ground meats together to re-form them to a heat stable chunk. Such preformed chunks are then incorporated into a final canned pet food product by combining a proportion of these preformed reconstituted meat chunks in a gel with a proportion of minced meat and textured vegetable protein chunks. Such methods however, do not easily lend themselves to the continuous production and packaging and are therefore expensive to carry out. Furthermore, the shape of the preformed reconstituted meat chunks does not lend itself to a can filling operation in which each can is required to contain a high and consistent proportion of the preformed chunks.

In such methods the reformed meat chunks tend to be either spherical or regularly cubic in shape and although chunky do not simulate very closely the texture of meat. A separate manufacturing process to make these re-formed chunks has to be set up, which of course in itself is expensive. There is a limit to the proportion of these chunks that can be filled at high speed in modern canning practice. Furthermore there is a tendency for the different chunks to separate during a high speed filling process and products can therefore result which have variable chunk contents.

Several procedures have been suggested and are in use for making alginate bound meat chunks, i.e. for reacting the alginates so as to form a gel. In one method an aqueous mixture of finely divided meat and a soluble aginate salt is formed into chunks. These preformed chunks are then treated with a solution containing calcium ions. This forms a skin of gelled calcium alginate around each chunk, which aids the shape retention of the chunk. Such a method is typified in U.K. Patent Specification No. 1,474,629.

An alternative method involves the use of a waterinsoluble calcium salt which is incorporated into the meat and alginate mix. This mixture is then formed into chunks which are then treated on the surface with an edible acid. This causes a surface solubilisation of the incorporated calcium salt, which then becomes available to react with the alginate salt also in the mixture of preformed chunks and thus gelled calcium alginate skin is formed at the surface. Such methods produce generally rounded chunks with relatively soft centres which do not resemble cut pieces of meat for example. In addition, to form sufficiently robust and thick skins so as to maintain the shape of the chunks long contact times in the calcium or acid solutions are necessary. These are obvious disadvantages in high volume continuous manufacturing processes, using materials that are sensitive to microbiological spoilage.

In an alternative method of forming re-formed chunks an aqueous solution of alginate salt is reacted with a mixture of ground meat or fat, a sparingly soluble calcium salt and a retarding agent. This method is described in U.K. Patent No. 1,302,432. The retarding agents commonly described in the literature are typically salts of phosphoric acid, citric acid or ethylene diamine tetracetic acid. The use of a retarding agent in this way allows some mixing of the calcium source throughout the meat and alginate salt mixture before setting takes place. After a period of time the calcium salt reacts with the alginate causing setting of the chunks from the inside. Use of retarding agents, such as these suffer from variable lengths of retarding time and can reduce the quality of the alginate gel formed.

U.K. Patent Specification No. 2058539 describes the use of sugars or polyhydric or monohydric alcohols as retarding agents. In this case the retarding agent is mixed with a sparingly soluble calcium salt and intimately mixed in a high speed mixer continuously with a mixture of finely divided meats and soluble alginate salt. The blended materials are then poured into moulds to form shapes or set on belts and subsequently set into shapes. In addition to the obvious disadvantages for high speed operation, such a method has the further disadvantages that it contains sugars or polyhydric alcohols which are relatively expensive and also the retardation times are only a few seconds to at most a minute or so. In addition, only a proportion of the meat lumps so formed are likely to be present in the final pet food product.

It is an object of the present invention to provide a method which avoids the disadvantages of the prior art methods and enables production and packing to be achieved at high speed in a continuous and consistent manner. A further object is to provide a reforming method which enables a much closer approach to the form and texture of the comminuted materials before comminution to be achieved. These and other objects are achieved according to the present invention by providing a method of producing a foodstuff which comprises forming at least one slurry of a first type comprising a gellable material, forming at least one slurry of a second type comprising a soluble gelling activator which will interact with said gellable material to effect gellation of said gellable material, bringing together said at least one slurry of a first type and said at least one slurry of a second type to form randomly shaped pieces of one of said slurry types in a matrix of the other of said slurry types, each of said randomly shaped pieces being encapsulated within a gel skin formed by interaction of said gelling activator with said gellable material at the surfaces of said randomly shaped pieces concurrently with said bringing together of said slurries of said first and second types, at least one of said slurry types and preferably at least the slurry type comprising the encapsulated randomly shaped pieces also comprising a comminuted edible material having food value. The method of the invention may be carried out batchwise or continuously.

Preferably said gelling activator is a non-toxic soluble salt of a polyvalent cation which reacts with the soluble gellable material to form a gel. Furthermore the slurry of said first and/or second type may also contain a retarding agent. Alternatively the at least one slurry of said first type may contain a substantially insoluble salt having a polyvalent cation, which polyvalent cation, if solubilized, would react with the soluble gellable material also contained in said slurry to form a gel, the slurry of said second type containing a solubilizing agent for the polyvalent cation of the said insoluble salt. Thus the at least one slurry of the first type could contain as the gellable material a non-toxic soluble alginate such as sodium alginate together with anhydrous dicalcium phosphate (as the insoluble salt) and the at least one slurry of the second type could contain citric acid as the gelling activator (in this case a solubilizing agent).

When the gellable material is, for example, a non-toxic soluble alkali metal alginate or pectate the gelling activator may be a non-toxic soluble salt having a polybasic, preferably divalent cation (e.g. calcium), such as calcium chloride or calcium citrate.

In a preferred embodiment the present invention provides a method of producing a foodstuff which comprises forming at least one slurry of a first type comprising a comminuted edible material having food value, a soluble gellable material and a retarding agent, forming at least one slurry of a second type containing a non-toxic soluble salt having a polyvalent cation which will interact with said soluble gellable material to form a gel, bringing together said slurries of said first and second types to form randomly shaped pieces of said slurry of said first type encapsulated within a skin formed by interaction of said soluble gellable material with said soluble salt concurrently with said bringing together of said slurries of said first and second types, said pieces being in a matrix formed of said slurry of said second type.

In the manner of the invention the two types of slurry are brought together with what in effect is a folding action so as to encapsulate portions of one type of slurry within a matrix of the other type of slurry. The soluble gelling activator of the second type of slurry interacts with the gellable material in the first type of slurry at the interfaces so formed to form gel skins which encapsulate each of the randomly shaped pieces of slurry. Thus the bringing together of the two types of slurries is effected such that one of the slurry types is broken into irregularly shaped masses surrounded by a matrix of the other slurry type, the soluble gelling activator and gellable material simultaneously reacting at the interfaces so formed to form a gel skin which encapsulates the irregularly shaped pieces of slurry. In this way a plurality of irregularly shaped encapsulated pieces within a matrix are formed which material can inter alia be fed directly to a canning process and lends itself to high speed continuous canning methods.

It has been found that a leaching of the soluble gelling activator and gellable material through the encapsulating gel skin can occur after the formation of the encapsulated pieces so that a gradual texturising of the inside of each of the irregularly shaped encapsulated pieces continues after their initial formation.

If desired a non-toxic sparingly soluble salt having the above-mentioned polyvalent cation can be incorporated in the first type and/or the second type of slurry. Thus in one embodiment of the present invention a first type of slurry of comminuted material containing a soluble gellable material and a retarding agent can be pre-blended with said sparingly soluble salt either dry or in the form of a third type of slurry, the polyvalent cation of which salt will on solubilisation react with the gellable material to form a gel. This pre-blend is then brought together with the slurry of the second type containing the soluble gelling activator capable of immediately interacting with the ingredients of the first slurry type to effect gelling of the soluble gellable material to form a gel in the manner of the invention.

In the method of the present invention, randomly shaped pieces or chunks are formed within a matrix of a slurry which not only causes an encapsulating skin to be immediately formed around the chunks but can also act at the same time as a filling medium so that the product can be directly fed into cans in a high speed can filling process. The slurry forming the interior of the randomly shaped pieces will still be soft immediately after formation and encapsulation and will be suspended in a matrix of the other type of slurry, the suspension thus being in a state which lends itself to high speed in-line filling of cans with a consistent, and if desired, high content of encapsulated pieces. The secondary leaching of soluble gelling activator through the preformed skins of the randomly shaped encapsulated pieces on the one hand, and the slow release of a sparingly soluble salt when present within the encapsulated pieces and/or matrix acts to texturise the interior of the encapsulated pieces after canning.

By the term 'sparingly soluble' is meant a salt which will dissolve to a maximum of 0.5 g of salt in 100 g of distilled water at 25° C. By the term 'soluble salt' is meant a salt which will dissolve to the extent of more than 0.5 g of salt in 100 g of distilled water at 25° C. The soluble salt is preferably a 'readily soluble' salt by which is meant one which will dissolve to the extent of more than 5 g of salt in 100 g of distilled water at 25° C.

The bringing together of the two slurry types in the method of the invention is preferably effected by the use of an open throated screw fed progressive cavity pump or a paddle bladed mixer conveyor, either of which can be run in a manner which will effectively break up one slurry type into irregularly shaped masses surrounded by a matrix of the other slurry type with the consequential simultaneous gel skin formation and suspension of the encapsulated pieces of one slurry type in a matrix of the other slurry type.

The inclusion of a soluble salt, preferably a readily soluble salt, provides sufficient readily available polyvalent cation to form with the soluble gellable material instant skins of gel without causing complete gelation of all the soluble gellable material available. The inclusion of a sparingly soluble salt in either or both slurry types allows polyvalent cations to become available at a later stage in the process causing hardening of the centres of the pieces by slow dissolution of cations within the pieces or diffusion of cations or soluble gellable material from the matrix through the previously formed skins into the pieces.

The screw fed, progressive cavity pump or a paddle bladed mixer conveyor or other apparatus used to bring together the gellable material with the polyvalent cation source is run to produce a specific folding and gentle mixing action that causes just sufficient contact to be made between gelling activator and soluble gellable material at the interfaces of the two slurry types to cause instant encapsulation of the randomly shaped pieces or chunks in gel skins but insufficient mixing to cause intimate blending such as would take place in a normally run high speed in-line mixer or high revolution impeller pump. Thus, the combined feed rates of the streams being fed to the pump or mixer conveyor and the speed of revolution of the pump or mixer conveyor may be so arranged to give the desired limited mixing action described above. Generally, the combined feed rate of incoming materials to the pump, mixer conveyor or other apparatus should be only just less than the speed at which the pump or mixer conveyor or other apparatus would normally be operated to pump away or convey that rate of material. Thus, the pump, mixer conveyor or other apparatus should preferably be run only slightly starved. If the speed of the pump, mixer conveyor or other apparatus is increased, in addition to generating a greater mixing action, such increase also reduces the size of the encapsulated pieces produced and has the effect of producing a finer textured final product. Too intimate a mixing however, produces a product that is lacking in any real texture. The preferred type of pump employed as a mixer, comprises a screw fed, open throat into which the materials to be pumped and mixed are fed. This screw feeds material into the pumping action of a helical rotor which rotates within a double helix stator. A suitable pump is exemplified by the "T" range of open throat positive displacement pumps produced by Mono Pumps Ltd. The preferred mixer conveyor is a paddle blade mixer conveyor (e.g. that manufactured by Simon Soletec).

In place of the progressive cavity type pump or mixer conveyor one can use any other device which can be operated to give a gentle folding or coating action rather than a vigorous blending action. Other devices that may be used are lobe pumps, screw fed mincers, barrel extruders and other variable speed in-line mixers.

The choice of device is dependent on such features as required throughput, handling characteristics of the different slurries, size and boldness of the particles or pieces that make up the final texture. Use of a pump or mixer conveyor as an in-line mixer in the manner of the invention makes it unnecessary to use a separate transfer pump to move the material to the next stage of the process. Manipulation of the encapsulated pieces subsequent to formation should be kept to a minimum. Excessive or too vigorous handling of the encapsulated pieces can cause the gel formation to break resulting in loss of gel strength and syneresis in the final product.

It has surprisingly been found that the skins so formed in the method of the invention do not adhere to one another and remain separately suspended in the matrix of the other slurry. The encapsulated pieces are sufficiently robust to remain in discrete form but are sufficiently pliable to be pumped in the matrix of the other slurry directly to a high speed industrial can filler without losing their coherent texture. Following filling and can seaming the product is also sufficiently heat stable to withstand conventional heat sterilisation processes. Another advantage of the product of the present invention is that it requires no further size reductions as by treatment by blades or dicing devices.

The operation of the process can be varied to accommodate a plurality of different streams all finally being gently mixed in the manner of the invention. One example of a mode of operation is:

(a) blend of comminuted (e.g. minced) material, soluble gellable material and retarding agent.

(b) slurry of sparingly soluble salt having the aforementioned polyvalent cation in water.

(c) slurry of gelling activator in water.

Streams from (a) and (b) can be intimately blended in an in-line efficient mixer. This blended stream from (a) and (b) above can now be fed into a gentle-action in-line pump mixer with the stream from (c). In this way good distribution of the sparingly soluble salt throughout the comminuted material/soluble gellable material/retarding agent mix occurs but no gelling action takes place until later in the operation due to presence of the retarding agent. However, instant skinning takes place on the outer surfaces of the randomly sized pieces by the action of the gelling activator on the soluble gellable material when the stream from (c) is added in the manner of the present invention. Alternatively slurry (b) can be blended with slurry (c) or with both slurry (a) and slurry (c), prior to being fed to the bringing together of the resulting two slurry types in the manner of the invention.

Various combinations and textural effects can be achieved by using different coloured blends of comminuted material and gellable materials. In this way for example, using comminuted meat/offal and gellable material simulation of light and dark poultry meat or lean meat with fat striations can be achieved.

Any suitable gellable material/gelling activator combination may be used in the method of the invention. Thus, non-toxic soluble alkali metal alginate salts, preferably the sodium salt, may be used as the soluble gellable material in combination with soluble calcium salts, preferably a readily soluble calcium salt such as calcium chloride as the gelling activator. Other gellable materials are, for example, non-toxic alkali metal salts of pectic acid, especially the sodium salt and also casein derivatives. Both synthetic materials and naturally occurring or extracted materials may be used as the gellable material.

In general the amount of soluble gellable material may be from about 0.3 to 3.0% by weight of the final product, and is preferably from 0.7 to 1.3% by weight of the final product. The amount of gelling activator depends in part on its actual solubility and in the case of a readily soluble salt may be from about 0.01 to 1.0% by weight, preferably 0.05 to 0.2% by weight of the final product.

The amount of sparingly soluble salt may, for example, be from about 0.2% to 2% by weight, preferably 0.5% to 1% by weight of the final product. When the soluble gellable material is an alginate, especially sodium alginate, the sparingly soluble salt is preferably calcium sulphate.

Suitable retarding agents are salts of phosphoric acid, ethylenediamine tetra-acetic acid or salts of citric acid. Preferred retarding agents are sodium hexametaphosphate, tetrasodium pyrophosphate and sodium citrate. The required level of retarding agent employed depends on the level of free cation likely to be present in the first slurry, the time required to hold this material before using it in the next part of the process and the particular retarding agent adopted. Typically, this will be in the range 0.02-0.2% by weight of final product. In making and bringing together the different streams of material in the manner of the invention, the ratio of one stream to the other can be used to modify the final texture achieved. If, for example, in the case of pet foods a product of meaty lumps in a free gravy effect is required, then a high proportion of polybasic cation containing slurry would be used. However, if a product of closely striated meat layers is required, then a lower proportion of slurry would be used. Generally, in pet foods, the amount of the slurry of the first type (e.g. a meat/alginate slurry stream will be greater than the amount of the slurry of the second type (e.g. a slurry stream containing calcium salts). Depending on the final pet food product required the ratio of slurry of the first type (e.g. meat/gellable material slurry) to slurry of the second type may be in the range of 33 to 1 to 2 to 1, with preferred ratio being in the range of from 10 to 1 to 5 to 1.

The viscosity, pH and temperature of the slurries do affect the performance of the method and the nature of the end product and can be used to impart a measure of control on the process and product in addition to the parameters already discussed. Thus the viscosity of the slurries affects the size of the pieces, the manner and degree of folding and the ability of the matrix to keep the encapsulated randomly shaped pieces in suspension; the pH affects the availability and activity of the activator; and the temperature has an effect on viscosity and rate of gellation.

The invention is illustrated by the following Examples:

EXAMPLE 1

(a) a blend of meat offals was prepared by mincing the following materials through a 10 mm plate and mixing together.

|  | % by weight |
| --- | --- |
| fresh chicken offal | 30 |
| beef tripe | 20 |
| fresh whole blood | 7 |
| beef trachea | 13 |
| pig trotters | 10 |
| liver | 10 |
| pig rinds | 10 |

(b) This meat offal blend was mixed with a solution of sodium alginate, retarding agent and other material required to make the product suitable for feeding to dogs to produce a slurry having the following composition:

|  | % by weight |
| --- | --- |
| mixed meat offal blend (from above) | 50.00 |
| sodium alginate | 1.00 |
| tetrasodium pyrophosphate | 0.10 |
| food colours | 0.05 |
| Vitamin/mineral mix - Canine | 0.5 |
| maize starch | 8 |
| Hot water (70° C.) | 40.35 |

(c) A suspension of calcium sulphate and calcium chloride was then made using guar gum as a thickening material to aid suspension of the calcium sulphate and also provide viscosity in the calcium slurry. The slurry had the following composition:

|  | % by weight |
| --- | --- |
| Calcium sulphate | 5.0 |
| Calcium chloride | 0.7 |
| Guar gum | 0.7 |
| Water (20° C.) | 93.6 |

The meat/alginate slurry (b) was then pumped at 80 kg/min into an open throated Mono pump type T-821 along with the calcium salts slurry (c) being separately pumped at 20 kg/min. The Mono pump was set to run at a rate that would pump a total of 110 kg/min of combined materials. The combined material issuing from the Mono pump was fed directly into a conventional can filler and cans of the combined slurry material were filled and heat processed at 260° F. for 65 minutes. The resulting product was a complete matrix of randomly shaped lumps with striated texture and had a very close similarity to high quality fibrous muscle meat. The product when removed from the can as a cylinder and sliced through with a knife showed a multiplicity of cut skins giving the impression of layers of striated meat. However, when gently pressed, the lumps would separate into discrete randomly shaped pieces.

EXAMPLE 2

(a) A slurry containing meat offal and alginate blend was prepared as in Example 1 (b).

(b) A slurry of a sparingly soluble calcium salt was prepared having the following composition:

|  | % by weight |
| --- | --- |
| Calcium sulphate | 15 |
| Guar gum | 0.7 |
| Water | 84.3 |
|  | 100.00 |

(c) A slurry composed of a readily soluble calcium solution was prepared having the following composition:

|  | % by weight |
|---|---|
| Calcium chloride | 0.1 |
| Guar gum | 0.7 |
| Water | 99.2 |
|  | 100.00 |

A series of 3 pumps was set up to allow continuous pumping of each of the three slurries (a), (b) and (c). The rate of each pump was adjusted such that the flows of each slurry were 80 kg/min., 5 kg/min, 15 kg/min. respectively. In addition, an efficient in-line high speed mixer allowed intimate mixing of the streams (a) and (b). Immediately following this, the combined well mixed (a)/(b) slurry was pumped into a gentle mixing Mono pump as previously described where it was gently coated with the slurry from (c). This gentle coating pump was run at a speed that would pump 110 kg/min. of product, with a combined total of 100 kg/min. being pumped to it. The issuing material was filled, canned and processed as in Example 1, and produced product of a similar nature.

EXAMPLE 3

(a) a slurry containing a meat offal and alginate mix was prepared as in Example 1(b).

(b) A second slurry containing meat offal and alginate blend of a much lighter colour was prepared having the following composition:

|  | % by weight |
|---|---|
| finely mixed chicken offal | 25.0 |
| finely mixed turkey offal | 25.0 |
| sodium alginate | 1.0 |
| tetrasodium pyrophosphate | 0.1 |
| titanium dioxide | 0.2 |
| vitamin/mineral mix - Canine | 0.5 |
| maize starch | 8.0 |
| hot water (70° C.) | 40.2 |
|  | 100.00 |

(c) A slurry containing suspension of sparingly soluble and readily soluble calcium salts was made as in Example 1(c). Three feed pumps and a gentle mixing Mono pump were arranged so that the three slurries (a), (b) and (c) produced above were pumped at rates of 60 kg/min., 20 kg/min. and 20 kg/min. simultaneously continuously and directly into the gentle mixing Mono pump set to pump at 110 kg/min. The issuing material was filled into cans and heat processed as in Example 1. The resulting product was a matrix of light and dark coloured meats with fibrous striations very similar to quality muscle meat and fat throughout the complete can.

EXAMPLE 4

(a) A meat offal blend was prepared as in Example 1(a).

(b) This meat offal blend was mixed with a sodium alginate solution and anhydrous dicalcium phosphate. As with Example 1(b) other ingredients were added to make the product suitable for feeding to dogs, and to produce a slurry having the composition:

|  | % by weight |
|---|---|
| mixed meat offal blend | 50.00 |
| sodium alginate | 1.00 |
| anhydrous dicalcium phosphate | 1.5 |
| food colours | 0.05 |
| vitamin/mineral mix -Canine | 0.5 |
| maize starch | 8.0 |
| water (70° C.) | 38.95 |

(c) A slurry comprising a thickened solution of food acid was prepared:

|  | % by weight |
|---|---|
| citric acid | 10.00 |
| guar gum | 0.70 |
| water | 89.3 |

The slurry (b) and the slurry (c) were simultaneously but separately pumped at rates of 95 kg/min. and 5 kg/min. respectively to a gentle mixing Mono pump running at a speed capable of pumping 110 kg/min. The issuing material was filled into cans and processed as in Example 1. The resulting canned product was very similar to that produced in Example 1.

In this Example, the calcium in the system added via the anhydrous dicalcium phosphate does not become active since dicalcium phosphate is almost insoluble at normal pH. However, in the presence of citric acid in the Mono pumps gentle mixing/coating action, surfaces of the meat/alginate/dicalcium phosphate blend comprising slurry (b) come into contact with the citric acid in slurry (c), the pH at these surfaces drops, the dicalcium phosphate dissolves making calcium available to react with and gel the sodium alginate and so form skins at the interfaces.

EXAMPLE 5

Example 1 was repeated except that instead of sodium alginate being used, sodium pectate (1% residual methyl groups) was used. The slurries were handled in the same way as in Example 1 with a canned product of very similar nature resulting.

EXAMPLE 6

(a) A meat offal blend was prepared as in Example 1(a).

(b) This meat offal blend was mixed with a solution of sodium alginate, retarding agent and other materials required to make the product suitable for feeding to cats to produce a slurry having the composition:

|  | % by weight |
|---|---|
| Mixed meat offal blend | 55 |
| Sodium alginate | 1 |
| Tetrasodium pyrophosphate | 0.15 |
| Food Colours | 0.05 |
| Vitamin mix (Feline) | 0.50 |
| Maize starch | 4.0 |
| Hot water 70° C. | 39.30 |
|  | 100.00 |

(c) A slurry comprising a solution of calcium chloride was prepared having the composition:

|  |  |
|---|---|
| Calcium chloride | 1.5 |

-continued

| | |
|---|---|
| Guar gum | 0.7 |
| Water | 97.80 |
| | 100.00 |

The slurry (b) was then pumped at 80 kg/min into an open throated Mono pump type T-821 along with the slurry (c) separately pumped at 20 kg/min. The Mono pump was set to run at a rate that would pump 140 kg/min of combined materials. The combined materials issuing from the Mono pump were fed directly into a conventional can filler and cans of combined slurry material were filled and heat processed at 260° F. for 65 minutes. The resulting product was a plurality of randomly shaped, small lumps suitable for feeding to cats.

EXAMPLE 7

Example 1 was repeated except that in place of a Mono pump, the slurries were folded together using a Simon Solitec 200 paddle bladed mixer conveyor, the feed rates being as in Example 1.

EXAMPLE 8

Example 2 was repeated except that in place of the Mono pump a Simon Solitec 200 paddle bladed mixer conveyor was used, the feed rates being as in Example 1.

EXAMPLE 9

Example 6 was repeated except that in place of slurry (c) a slurry containing a solution of calcium lactate was used having the following composition:

| | |
|---|---|
| Calcium lactate | 3.80 |
| Guar gum | 0.70 |
| Water | 95.50 |
| | 100.00 |

EXAMPLE 10

Example 1 was repeated except that in place of the Mono pump, the slurries were folded together in a variable speed Lobe pump (Model AP400 made by Stainless Steel Pumps Ltd). The pump was run at a speed capable of pumping 150 kg/min whereas the combined feeds of slurries totalled 100 kg/min.

EXAMPLE 11

Example 1 was repeated except that in place of a Mono pump the slurries were folded together in a screw-fed mincer (14 inch Mincer manufactured by Weiller Manufacturing Co.) fitted with 25 mm plate but no rotating knife.

EXAMPLE 12

Example 1 was repeated except that in place of a Mono pump the slurries were folded together in a screw-fed variable speed extruder (6 inch Bonnat Extruder). The extruder was filled with 25 mm round hole die plate.

EXAMPLE 13

The procedure of Example 6 was repeated except that in place of the meat/offal blend, 100% minced whitefish was used.

EXAMPLE 14

(a) Minced beef was prepared by mincing forequarter beef through an 8 mm plate.

(b) This minced beef was mixed with a solution of sodium alginate, retarding agent and other material required for making the product suitable for human consumption to form a slurry having the following composition:

| | % by weight |
|---|---|
| Minced forequarter beef | 65 |
| Sodium alginate | 1.5 |
| Tetrasodium pyrophosphate | 0.1 |
| Food colours | 0.03 |
| Salt | 0.2 |
| Maize starch | 5.0 |
| Hot water | 28.17 |
| | 100.00 |

(c) A slurry comprising calcium lactate solution was prepared having the following composition:

| | % by weight |
|---|---|
| Calcium lactate | 3.0 |
| Maize starch | 2.8 |
| Water | 94.2 |
| | 100.00 |

The slurry (c) was heated to 90° C. and held for 5 minutes to gelatinise the starch and then cooled to 20° C. before use.

The slurry (b) was pumped at 90 kg/min into an open throated Mono pump type T 821 and the slurry (c) separately pumped into the said Mono Pump at 10 kg/min. The Mono pump was set to run at a rate that would pump a total of 130 kg/min of combined materials. The combined material issuing from the Mono pump was fed directly into a conventional can filler and cans of the combined slurry material were filled and heat processed at 260° F. for 65 minutes. The resulting product had a striated texture similar to high quality fibrous muscle meat.

EXAMPLE 15

All procedures were followed as in Example 14 except that in place of minced forequarter beef, minced cod was used. The resulting product had a fleshy striated texture similar to cod steaks.

EXAMPLE 16

(a) A slurry composed of a blend of apple pulp, sodium alginate and other materials was made to have the following composition:

| | |
|---|---|
| Apple pulp | 70 |
| Sodium alginate | 1.0 |
| Tetrasodium pyrophosphate | 0.1 |
| Maize starch | 4.0 |
| Water | 24.9 |
| | 100.0 |

(b) A slurry comprising a solution of calcium lactate was prepared as in Example 14(c).

The apple pulp and alginate containing slurry (a) was pumped at 90 kg/min into Simon Solitec 200 paddle bladed conveyor, the calcium lactate slurry (b) being separately pumped into the said conveyor at 10 kg/min. The Simon Solitec mixer-conveyor speed was adjusted to allow a throughput of 140 kg/min of combined slurries. The material issuing from the mixer-conveyor was fed directly into a conventional can filler and cans of the combined slurry material were filled and processed at 235° F. for 70 minutes. The resulting product was composed of discrete particles of apple material with a distinct texture more resembling fresh apple pieces rather than canned apple which tends to lose its texture and become soft. The material was suitable as part of a dessert or as the filling for pastry covered pies.

I claim:

1. A method of producing randomly formed and irregularly shaped edible chunks of comminuted material disposed in a matrix slurry, said chunks having an outer gel skin, comprising forming at least one first slurry comprising a soluble gellable material;

forming at least one second slurry comprising a soluble gelling activator which will interact with said soluble gellable material;

wherein at least one of said slurries contains a comminuted food material, bringing said slurries together while concurrently imparting a limited mixing action thereto and thereby breaking up said slurry containing food material into a plurality of randomly formed and irregularly shaped chunks surrounded by the matrix of the non-food slurry while simultaneously reacting the soluble gellable material with said soluble gelling activator at the interfaces of said shaped chunks to form a gel skin encapsulating each of said irregularly shaped chunks;

said gellable material and said gelling activator being present in an amount sufficient to produce said gel skin encapsulating said chunks;

said encapsulated chunks being sufficiently robust to remain in discrete form and sufficiently pliable to be pumped in the matrix of the non-food slurry directly to a high speed industrial container filler for packaging.

2. The method as defined in claim 1 wherein said comminuted food material is in said first slurry, said soluble gelling activator is in said second slurry and is a non-toxic soluble salt having a polybasic cation which will interact with said soluble gellable material to form a gel, and said method includes the steps of bringing said slurries together while applying a gentle stirring to break up said first slurry into a plurality of irregularly shaped chunks surrounded by the matrix of the second slurry and simultaneously reacting the soluble gellable material at the interfaces of said shaped chunks with said polybasic cation of said soluble salt in the second slurry to form a gel skin encapsulating said irregularly shaped chunks.

3. The method as defined in claims 1 or 2 including the further step of leaching said soluble salt having a polybasic cation and said gellable material through said gel skin encapsulating said chunks whereby texturizing of the interiors of said chunks continues after their initial formation.

4. A method as claimed in claims 1 or 2 wherein said gellable material is a non-toxic alkali metal alginate.

5. A method as claimed in claim 4 wherein said gelling activator is a non-toxic soluble calcium salt.

6. A method as claimed in claim 5 wherein said calcium salt is calcium chloride.

7. A method as claimed in claims 1 or 2 wherein said gellable material is an intimate mixture of a non-toxic alkali metal alginate and a non-toxic insoluble salt having a polybasic cation which if solubilized will react with said alginate to form a gel and said gelling activator is a non-toxic solubilizing agent for said polybasic cation.

8. A method as claimed in claim 7 wherein said polybasic cation is calcium and the solubilising agent is an acid.

9. A method as claimed in claim 8 wherein said acid is citric acid.

10. The method as defined in claims 1 or 2 wherein said first slurry includes a non-toxic sparingly soluble salt having a polybasic cation which, when solubilized, will react with said gellable material to form a gel and said second slurry includes a non-toxic solubilizing agent for said sparingly soluble salt whereby the subsequent leaching of said soluble gelling activator through the gel skins encapsulating said chunks and the slow release of said sparingly soluble salt within said encapsulated chunks texturize the interior of said chunks.

11. A method as claimed in claims 1 or 2 wherein the amount of soluble gellable material present is from about 0.3 to 3% by weight of the edible chunks and the matrix.

12. A method as claimed in claim 11 wherein said amount of soluble gellable material present in the foodstuff is from 0.7 to 1.3% by weight of the foodstuff.

13. A method as claimed in claim 11 wherein the amount of gelling activator present in the foodstuff is from about 0.01 to 1% by weight of the foodstuff.

14. A method as claimed in claim 13 wherein said amount of gelling activator in the foodstuff is from about 0.05 to 0.2% by weight of the foodstuff.

15. A method as claimed in claims 1 or 2 wherein a non-toxic sparingly soluble salt having a polybasic cation which will react with the gellable material to form a gel is incorporated in the first and/or the second slurry.

16. A method as claimed in claim 15 wherein said polybasic cation is calcium.

17. A method as claimed in claim 16 wherein said sparingly soluble salt having a polybasic cation is calcium sulphate.

18. A method as claimed in claim 16 or claim 17 wherein the amount of sparingly soluble salt in the foodstuff is from about 0.2% to 2% by weight of the foodstuff.

19. A method as claimed in claim 18 wherein said amount of sparingly soluble salt in the foodstuff is from 0.5% to 1% by weight of the foodstuff.

20. A method as claimed in claims 1 or 2 wherein a retarding agent is incorporated in the first slurry and/or the second slurry.

21. A method as claimed in claim 20 wherein said retarding agent is a member selected from the group consisting of a non-toxic salt of citric acid, sodium hexametaphosphate, tetrasodium pyrophosphate and sodium citrate.

22. A method as claimed in claim 20 or 21 wherein said retarding agent is present in the foodstuff in an amount of from 0.02% to 0.2% by weight of the foodstuff.

23. A method as claimed in claims 1 or 2 wherein the weight ratio of the first slurry to the second slurry in the edible chunks disposed and the matrix slurry is from 33 to 1 to 2 to 1.

24. A method as claimed in claim 23 wherein said weight ratio is from 10 to 1 to 5 to 1.

25. A method as claimed in claim 1 or 2 wherein a plurality of slurries of at least one of said slurries are used and in that at least two of the individual slurries comprising said plurality are of different colours or shades.

26. A method as claimed in claim 25 wherein two or more slurries comprising a blend of comminuted material and gellable material are used and in that said two or more slurries have different colours or shades.

27. The method of claim 26, wherein two or more slurries comprising a blend of comminuted material and gellable material are used and in that said two or more slurries have different colours or shades.

28. The method of claim 26, wherein a non-toxic sparingly soluble salt having a polyvalent cation which will react with the gellable material to form a gel is incorporated in the first type and/or the second type of slurry.

29. The method of claim 26, wherein said retarding agent is sodium hexametaphosphate, tetrasodium pyrophosphate or sodium citrate.

30. A method as claimed in claim 3 wherein said gellable material is a non-toxic alkali metal alginate.

31. A method as claimed in claim 10 wherein said gellable material is a non-toxic alkali metal alginate.

32. A method as claimed in claim 3 wherein a plurality of slurries of at least one of said slurries are used and in that at least two of the individual slurries comprising said plurality are of different colours or shades.

33. A method as claimed in claim 10 wherein a plurality of slurries of at least one of said slurries are used and in that at least two of the individual slurries comprising said plurality are of different colours or shades.

34. A method for producing chunky pet food comprising a plurality of randomly formed and irregularly shaped chunks of comminuted food material selected from the group consisting of meat, poultry, fish and mixtures thereof, said chunks being dispersed in a matrix slurry, each of said chunks having an outer gel skin with the food material in the interiors of said chunks being textured to substantially the consistency of one constituent of said food material prior to comminution, said method comprising forming at least one first slurry comprising a soluble gellable material, forming at least one second slurry comprising a soluble gelling activator which will interact with said soluble gellable material to form a gel, one of said slurries containing said comminuted food material, bringing each of said slurries together into a zone at a rate sufficient to enable an applied gentle stirring to break up said slurry containing the comminuted food material into a plurality of irregularly shaped chunks, gently folding said other slurry over said plurality of chunks and surrounding said chunks with said other slurry while simultaneously reacting the soluble gellable material with said soluble gelling activator at the interfaces of said shaped chunks to form a gel skin encapsulating each of said irregularly shaped chunks, said gellable material and said gelling activator being present in an amount sufficient to form said gel skin encapsulating said chunks said encapsulated chunks being sufficiently robust to remain as individual chunks and being sufficiently pliable to be pumped in the matrix of the other slurry directly to a high speed packaging apparatus for packaging in a container.

35. A method for producing chunky pet food comprising a plurality of randomly formed and irregularly shaped chunks of comminuted food material selected from the group consisting of meat, poultry, fish and mixtures thereof, said chunks being dispersed in a matrix slurry, each of said chunks having an outer gel skin with the food material in the interiors of said chunks being textured to substantially the consistency of one constituent of said food material prior to comminution, said method comprising forming at least one first slurry comprising a soluble gellable material, forming at least one second slurry comprising a soluble gelling activator which will interact with said soluble gellable material to form a gel, one of said slurries containing said comminuted edible material, said weight ratio of said slurry containing said comminuted food material to the other slurry being from 33 to 1 to 2 to 1 by weight of said pet food, said amount of soluble gellable material is from about 0.3 to 3% by weight of said pet food, said amount of gelling activator is from about 0.01 to 1% by weight of said pet food, said first slurry or said second slurry having a retarding agent therein, said retarding agent being present in an amount of from about 0.02% to 0.2% by weight of the pet food, bringing each of said slurries together into a zone at a different volume rate per unit of time, said slurry containing said comminuted food material entering said zone in substantially greater volume than said other slurry, applying gentle stirring in said zone to break up said slurry containing the comminuted food material into a plurality of irregularly shaped chunks, gently folding said other slurry over said plurality of chunks to surround said chunks with said other slurry while simultaneously reacting said soluble gellable material with said gelling activator at the interfaces of said shaped chunks to form a gel skin encapsulating each of said irregularly shaped chunks, said encapsulated chunks being sufficiently robust to remain as individual chunks and being sufficient pliable to be pumped in the matrix of the other slurry directly to a high speed packaging apparatus for packaging in a container.

36. A method for producing chunky pet food as defined in claim 35 wherein said weight ratio of said slurry containing said comminuted food material to said other slurry is from 10 to 1 to 5 to 1, said amount of soluble gellable material is from about 0.7 to 1.3% by weight of said pet food, and said amount of gelling activator is from about 0.05 to 0.2% by weight of said pet food.

37. The method for producing chunky pet food as defined in claims 35 or 36 wherein said gellable material is a non-toxic alkali metal alginate, said gellable activator is a non-toxic soluble calcium salt, said first slurry or said second slurry containing a non-toxic sparingly soluble salt having a polybasic cation capable of reacting with said gellable material to form a gel, said sparingly soluble salt being present in an amount of from about 0.2 to 2% by weight of said pet food, said first slurry or said second slurry containing a retarding agent, said retarding agent being present in an amount of from about 0.02% to 0.2% by weight of the pet food.

38. The method for producing chunky pet food as defined in claim 32 wherein said gelling activator is a non-toxic calcium salt, said polybasic cation of said non-toxic sparingly soluble salt is calcium, said solubilizing agent is an acid, and said retarding agent is a member of the group consisting of citric acid, sodium hexametaphosphate, tetrasodium pyrophosphate and sodium citrate.

39. The method for producing chunky pet food as defined in claim 38 wherein said non-toxic calcium salt is calcium chloride, said non-toxic sparingly soluble salt having a calcium cation is calcium sulfate and said acid solubilizing salt is citric acid.

40. A method as defined in claim 35 or 36 wherein the volume rate per unit of time of said slurry containing the comminuted food material entering said zone relative to the volume rate of said other slurry is from about 4 to 1 to about 19 to 1.

41. A method as defined in claim 37 wherein the volume rate per unit of time of said slurry containing the comminuted food material entering said zone relative to the volume rate of said other slurry is from about 4 to 1 to about 19 to 1.

42. A method as defined in claim 38 wherein the volume rate per unit of time of said slurry containing the comminuted food material entering said zone relative to the volume rate of said other slurry is from about 4 to 1 to about 19 to 1.

43. A method as defined in claim 39 wherein the volume rate per unit of time of said slurry containing the comminuted food material entering said zone relative to the volume rate of said other slurry is from about 4 to 1 about 19 to 1.

* * * * *